United States Patent
Qin et al.

(10) Patent No.: US 8,102,822 B2
(45) Date of Patent: Jan. 24, 2012

(54) SYSTEM AND METHOD FOR RANDOM ACCESS SCHEME IN A WIRELESS AD-HOC NETWORK

(75) Inventors: Xiangping Qin, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 758 days.

(21) Appl. No.: 12/172,858

(22) Filed: Jul. 14, 2008

(65) Prior Publication Data

US 2010/0008347 A1    Jan. 14, 2010

(51) Int. Cl.
*H04W 84/18* (2009.01)
(52) U.S. Cl. .......................... 370/337; 370/347
(58) Field of Classification Search .................. 370/337, 370/347

See application file for complete search history.

(56) References Cited

U.S. PATENT DOCUMENTS

| | | | |
|---|---|---|---|
| 7,856,002 | B2 | 12/2010 | Qin et al. |
| 2006/0245440 | A1* | 11/2006 | Mizukoshi ............ 370/400 |
| 2009/0103501 | A1* | 4/2009 | Farrag et al. .......... 370/337 |

OTHER PUBLICATIONS

Multiband OFDM Alliance (MBOA) et al., "Distributed Medium Access Control (MAC) for Wireless Networks, Draft 0.99", MBOA and WiMedia Alliance, Inc., Nov. 1, 2005, pp. i-176, United States.
IEEE Computer Society, "IEEE Std 802.15.3b™-2005, IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), Amendment 1: MAC Sublayer", IEEE, May 5, 2006, pp. i-146, New York, United States.

(Continued)

*Primary Examiner* — Melvin Marcelo
(74) *Attorney, Agent, or Firm* — Kenneth L. Sherman, Esq.; Michael Zarrabian, Esq.; Myers Andras Sherman & Zarrabian LLP

(57) ABSTRACT

A system and method for random access scheme in a wireless ad-hoc network is disclosed. In one aspect, the method comprises transmitting data to a receiving node in a wireless ad-hoc network in a first time block previously reserved for transmission. The method further comprises transmitting data to the receiving node in a second time block if the reservation is periodic, the second time block starting at a time being a fixed amount of time L after the start of the first time block.

25 Claims, 5 Drawing Sheets

OTHER PUBLICATIONS 802.11 Working Group of the 802 Committee, "IEEE P802.11n™/D1.0, Draft Amendment to STANDARD [FOR] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput", IEEE, Mar. 2006, pp. i-328, New York, United States.

LG Electronics Inc. et al., "WirelessHD Specification Version 1.0 Overview", LG Electronics Inc. et al., Oct. 9, 2007, pp. i-77, United States, http://www.wirelesshd.org/pdfs/WirelessHD_Full_Overview_071009.pdf.

IEEE Computer Society, "IEEE Std 802.15.3™-2003, IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs)", IEEE, Sep. 29, 2003, pp. i-315, New York, United States.

Hitachi, Ltd. et al., "High-Definition Multimedia Interface Specification Version 1.2a", HDMI Licensing, LLC, Dec. 14, 2005, pp. 1-193, United States, http://www.hdmi.org/download/HDMI_Specification_1.2a.pdf.

IEEE Computer Society, "IEEE Std 802.11™-2007, IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE, Jun. 12, 2007, pp. i-1184, New York, United States.

* cited by examiner

SYSTEM AND METHOD FOR RANDOM ACCESS SCHEME IN A WIRELESS AD-HOC NETWORK

BACKGROUND OF THE INVENTION

1. Field of the Invention

The present invention relates to wireless transmission, and in particular, to bandwidth reservation in a wireless ad-hoc network.

2. Description of the Related Technology

With the proliferation of high quality video, an increasing number of electronic devices, such as consumer electronic devices, utilize high definition (HD) video which can require about 1 Gbps (giga bits per second) in data rate, hence high bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be in error and the picture quality can be reduced.

The High-Definition Multimedia Interface (HDMI) specification allows transfer of uncompressed HD Audio/Video data between devices via a cable. While consumer electronics makers are beginning to offer HDMI-compatible equipment, there is not yet a suitable wireless (e.g., radio frequency) technology that is capable of transmitting uncompressed HD video data. Wireless local area network (WLAN) and similar technologies can suffer interference issues when several devices, which do not have the bandwidth to carry the uncompressed HD Audio/Video data, are connected together.

SUMMARY OF CERTAIN INVENTIVE ASPECTS

The system, method, and devices of the invention each have several aspects, no single one of Which is solely responsible for its desirable attributes. Without limiting the scope of this invention, its more prominent features will now be briefly discussed.

In one aspect, a method of reserving channel bandwidth for transmission in a wireless ad-hoc network is disclosed. The method comprises, at a transmitter node in a wireless ad-hoc network, transmitting data to a receiving node in a wireless ad-hoc network in a first time block previously reserved for data transmission. The method further comprises transmitting data to the receiving node in a second time block if the reservation is periodic, the second time block starting at a time being a fixed amount of time L after the start of the first time block.

In another aspect, a device for data transmission in a wireless ad-hoc network is disclosed. The device comprises a storage unit having stored therein a software module. The device further comprises a control unit configured to execute the software module to a) transmit data to a receiving node in a wireless ad-hoc network in a first time block previously reserved for data transmission, and b) transmit data to the receiving node in a second time block if the reservation is periodic, the second time block starting at a time being a fixed amount of time L after the start of the first time block.

In another aspect, a device for data transmission in a wireless ad-hoc network is disclosed. The device comprises a storage unit having stored therein a software module. The device further comprises a control unit configured to perform the software module to a) transmit a first periodic clear-to-send (CTS) message to a transmitting node in a wireless ad-hoc network in a first time block previously reserved for periodic transmission, and b) transmit a second periodic CTS message to the transmitting node in a second time block if the reservation is periodic, the second time block having the same duration as the first time block and starting at a time being with a fixed amount of time (L) after the start of the first time block.

DETAILED DESCRIPTION OF CERTAIN INVENTIVE EMBODIMENTS

Certain embodiments provide a method and system for bandwidth reservation using a random access scheme in a wireless ad hoc network. These embodiments address the problem of medium access control for transmitting isochronous traffic in a wireless ad hoc network. Isochronous traffic is the type of traffic where the packet arrives with equal frequency. Though certain embodiments are described using the example of transmitting uncompressed high definition video signals, the embodiments may be used for transmitting any data or signals.

In one embodiment, a transmitting device ("transmitter") and a receiving device ("receiver") first contend with other wireless devices for the channel to transmit a first pair of a request-to-send (RTS) and clear-to-send (CTS) messages. The first pair of RTS and CTS messages reserves a block of channel time for isochronous transmission. The transmitter and receiver then transmit RTS and CTS messages periodically every super-frame. Each pair of RTS and CTS messages is transmitted at the channel time reserved by the previous pairs.

The following detailed description is directed to certain sample embodiments of the invention. However, the invention can be embodied in a multitude of different ways as defined and covered by the claims. In this description, reference is made to the drawings wherein like parts are designated with like numerals throughout.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
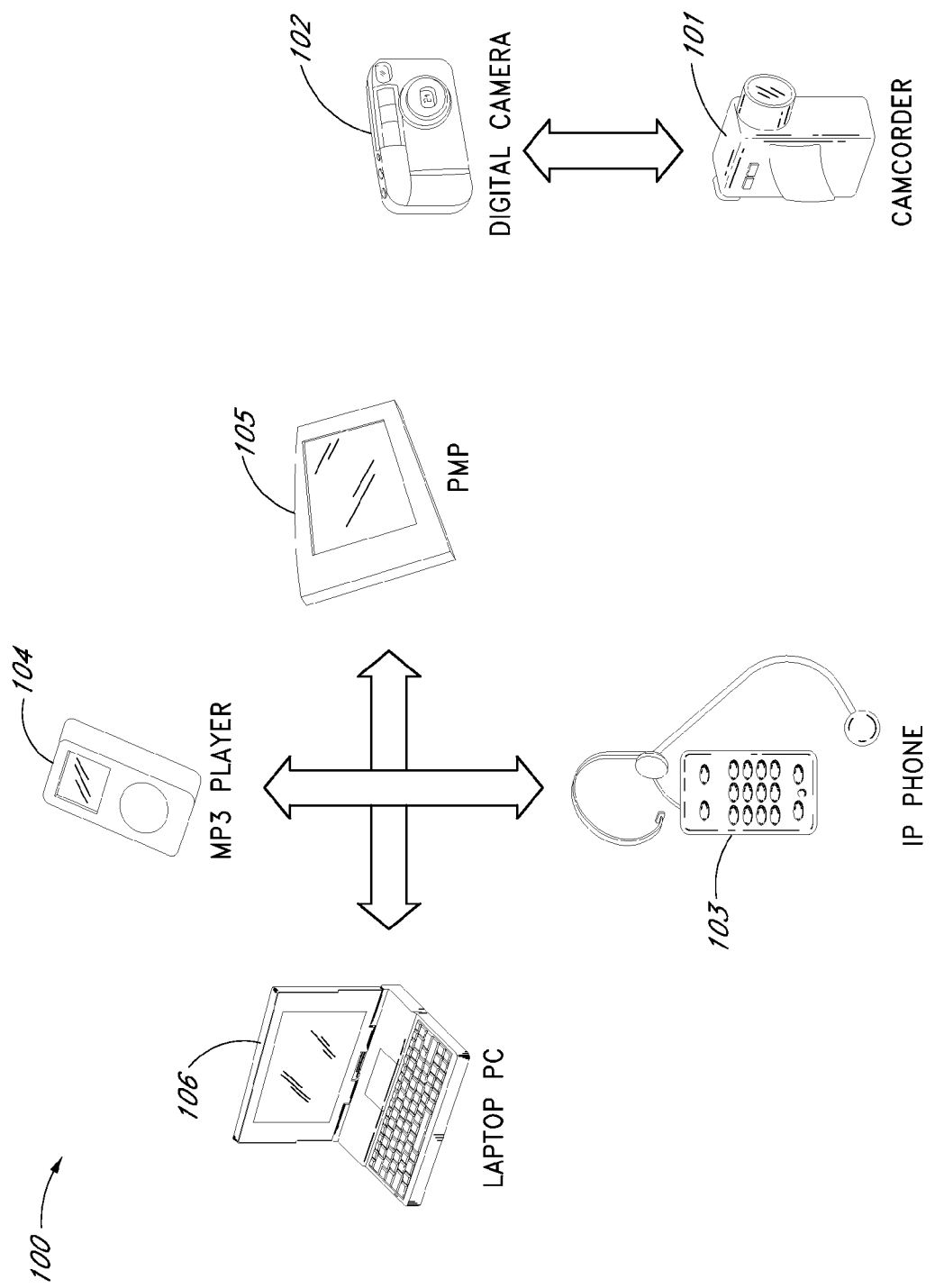
FIG. 1 is a functional block diagram illustrating an example wireless ad-hoc network 100.

Exemplary implementations of embodiment in a wireless network will now be described. FIG. 1 is a block diagram illustrating an example wireless ad-hoc network 100. The wireless ad-hoc network 100 has no centralized controller or coordinator. Nodes in the network form multi-hop ad-hoc networks.

In one embodiment, the example wireless network 100 includes at least two stations 101 and 102. Wireless connection may be established between the stations without using a centralized controller or coordinator. In the example wireless network, the stations 101 and 102 include wireless clients. In some embodiments, the wireless stations 101 and 102 support the IEEE 802.11 Protocol. The wireless network 100 may include additional stations 103, 104, 105, and 106. Further connection among them may be established.

In certain embodiments, the wireless station 101 includes a receiver of wireless signals, and the wireless station 102 includes a sender of the wireless signals. In other embodiments, the wireless station 101 includes a sender of wireless signals, and the wireless station 102 includes a receiver of the wireless signals. In some of such embodiments, the wireless signals include audio content. In other embodiments, the wireless signals include video content. In yet another embodiment, the wireless signals include text content such as a publication. The wireless stations 101 and 102 can be a sink of video and/or audio data implemented, such as, in a high definition television (HDTV) set in a home wireless network environment. The wireless stations 101 and 102 can be a source of compressed or. uncompressed video or audio. Examples of the wireless station 101 and 102 include a camcorder, a digital camera, a laptop computer, a MP3 player, an IP phone, a personal media player (PMP) as shown. Such examples also include a desktop computer, a set-top box, a DVD player or recorder, and so forth. In some embodiments, the content can be protected content.

In certain embodiments, the wireless network 100 is used to support audio and video applications with isochronous traffic. Multiple simultaneous streams, e.g., between the station 101 and 102, 103 and 104, 105 and 106 respectively, may be supported by the network 100 as shown in FIG. 1. In one embodiment, multiple simultaneous streams may be supported between a wireless station as the transmitter, e.g. 101, and several other wireless stations as the receiver, e.g., 102 and 103.

In certain embodiments, the wireless station comprises a control unit (not shown) and a storage unit (not shown). The control unit controls the operation of the wireless station. In one embodiment, the control unit is a processor which may be any suitable general purpose single- or multi-chip microprocessor, or any suitable special purpose microprocessor such as a digital signal processor, microcontroller, or a programmable gate array. As is conventional, the processor may be configured to execute one or more software applications. The storage unit stores data and software applications the control unit runs to control the operation of the wireless station. The storage unit may be any suitable type of storage device including any computer-readable medium. In the exemplary embodiment, a wireless station has stored on the storage unit a random access control software module, which may be executed by the control unit to perform a method (will be described later) for random access scheme in the wireless network 100.

Figure 2:
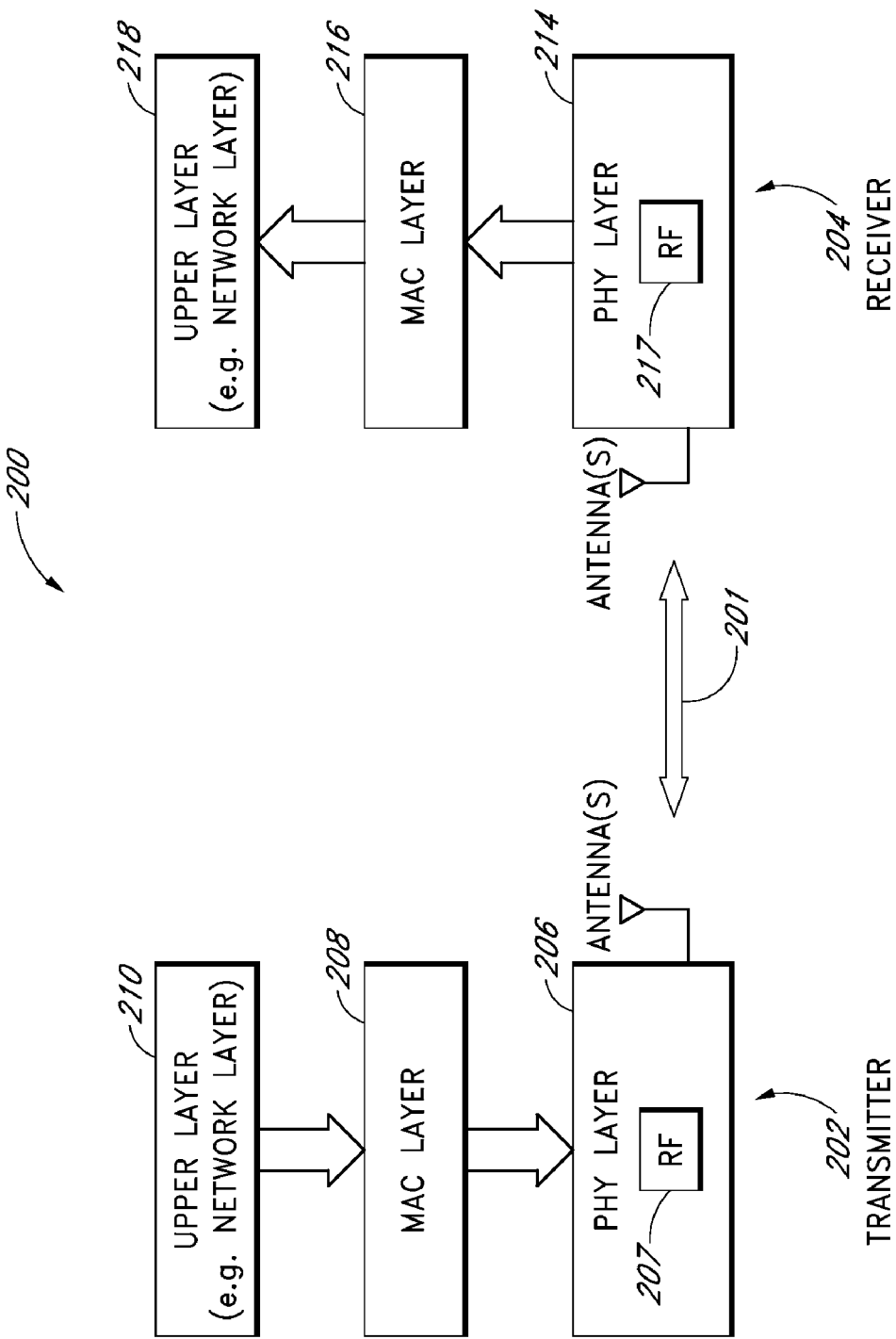
FIG. 2 is a functional block diagram of an example communication system for transmission of uncompressed HD video over a wireless medium, according to one embodiment of the system and method.

FIG. 2 shows a generalized block diagram illustrating an example wireless network system 200. The example wireless network system 200 includes a wireless transmitter 202 and wireless receiver 204. The transmitter 202 includes a physical (PHY) layer 206, a media access control (MAC) layer 208, an upper layer 210, and one or more antennas. Similarly, the receiver 204 includes a PHY layer 214, a MAC layer 216, an upper layer 218, and one or more antennas. In some embodiments, the PHY layers 206, 214 include radio frequency (RF) modules 207, 217. The PHY layers 206, 214 provide wireless communication between the transmitter 202 and the receiver 204 via the RF modules 207, 217 and the one or more antennas through a wireless medium 201. The MAC layers 208, 216 provides addressing and channel access controls that make it possible for several network nodes to communicate within a multipoint network such as the wireless network 100 shown in FIG. 1.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of getting data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer.

In the wireless transmitter 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the wireless receiver 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 218 where the messages are further processed and/or transferred to other modules or devices to be displayed (text or graphics) or played (audio), for example.

Figure 3:
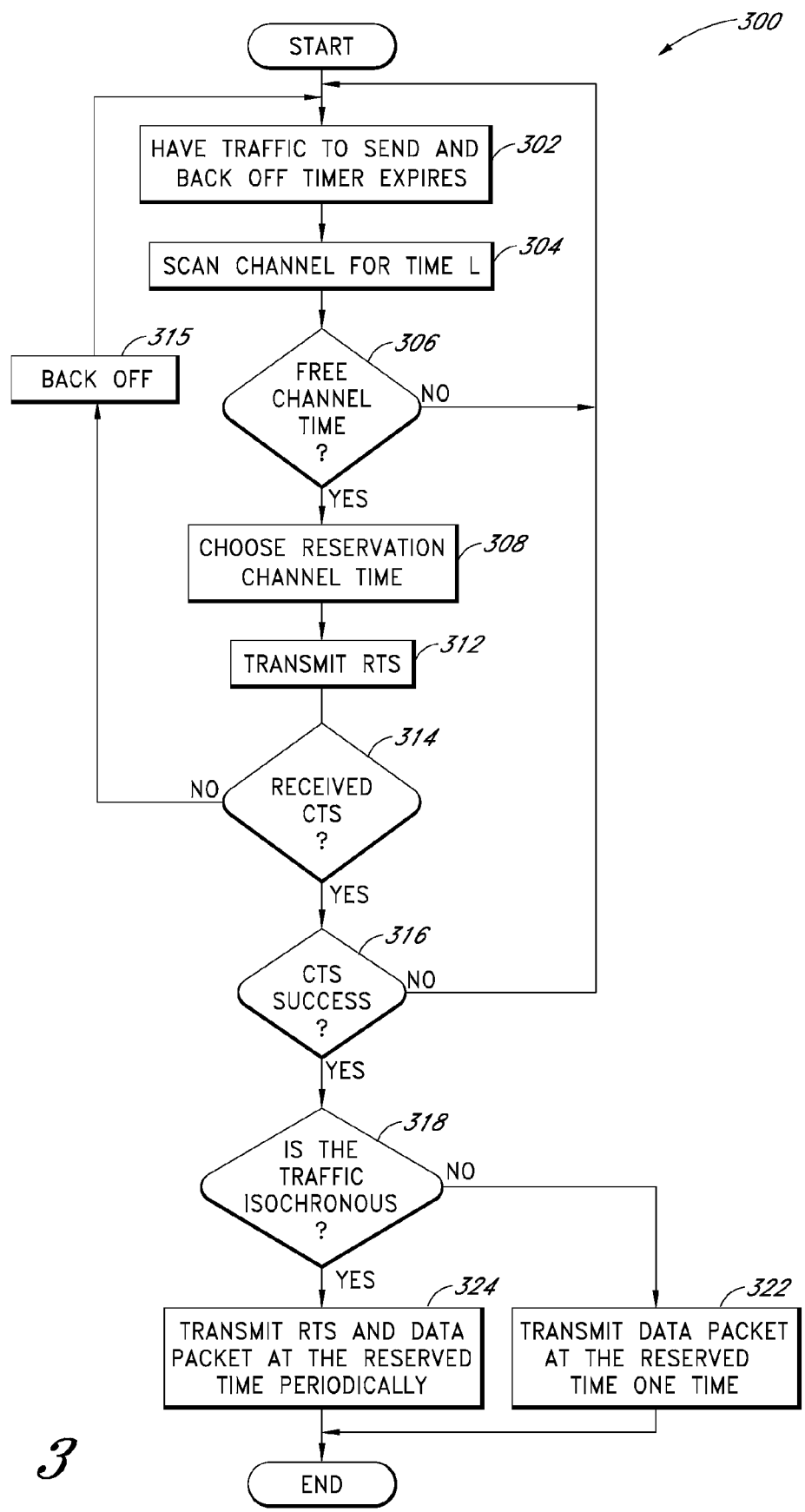
FIG. 3 is a flowchart illustrating one embodiment of a method for reserving channel bandwidth in a wireless ad-hoc network which may be performed by a transmitter.

FIG. 3 is a flowchart illustrating one embodiment of a method for reserving channel bandwidth in a wireless ad-hoc network. The method may be performed, for example, by a wireless station ("transmitter") transmitting data to another wireless station ("receiver") in the wireless ad-hoc network 100. The method may be performed by the control unit of the transmitter running a random access control software module stored in the storage unit of the transmitter. Depending on the embodiment, certain blocks of the method may be removed, merged together, or rearranged in order.

The method 300 begins at a block 302, wherein a transmitter has traffic to send to another wireless station and a back off timer expires. The back off timer is set to hold the transmitting station from transmission for a certain time. Moving to a block 304, the transmitter scans the channel for a fixed amount of time L, i.e., the duration of a super-frame. The scanning may start at any random time point when the transmitter is ready. At a block 306, the transmitter determines whether there is free channel time, i.e., a time in which the channel is free for transmission.

If there is no free channel time, the method 300 moves back to block 302. If there is free channel time, the method 300 then moves to a block 308.

At block 308, the transmitter chooses a time block to reserve for future transmission. The reserved time block may start from any random time point. In one embodiment, the time reserved is chosen from the free channel time. Next at a block 312, the transmitter transmits a request-to-send (RTS) frame to the receiver. The RTS message includes the time block to reserve for transmission. The RTS message may also include information indicating whether the channel reservation is isochronous or one-time, depending on the traffic type.

Next at a block 314, the transmitter checks whether a clear-to-send (CTS) frame is received at the transmitter. A CTS message is a frame sent by the receiver to either confirm or reject the reservation proposed by the RTS message, after the receiver checks the availability of the receiver's channel during the time requested. The CTS message includes information indicating whether the reservation requested by the RTS message is confirmed. The receiver may send a CTS message rejecting the requested channel reservation if the receiver's channel is busy during the time requested. If the CTS message confirms the requested channel reservation, the frame may also include the same reservation information as in the RTS message, such as the time block to reserve for transmission and information indicating whether the channel reservation is isochronous.

The method moves to a block 316, if the transmitter receives a CTS message from the receiver within a period of pre-determined time. The method moves to a block 315, if the transmitter does not receive a CTS message from the receiver within a period of pre-determined time. At block 315, the transmitter holds the attempt to transmit for some time before moving back to the block 302.

Moving to a block 316, the transmitter checks whether the received CTS message confirms the reservation proposed by the RTS message. If the received CTS message rejects the reservation, the method 300 moves back to block 302. If the received CTS message confirms the reservation, the method 300 moves to a block 318.

At block 318, the transmitter checks whether the channel reservation proposed is isochronous. If the proposed channel reservation is not isochronous, the method moves to a block 322, wherein the transmitter transmits data at the reserved time for one time.

If the proposed channel reservation is isochronous, the method 300 moves to a block 324, wherein the transmitter transmits a RTS message and data at the reserved time periodically every super-frame. Each RTS message is transmitted at the channel time reserved by the previous RTS message. Since isochronous use of the channel is confirmed, the transmitter does not need to scan the channel again prior to sending the RTS message and data. Also, under this scheme, any device listens to the channel for one super-frame time before it transmits. If a periodic RTS or CTS message for other traffic reservations is heard, the device does not transmit for the reserved time in current super-frame and the next super-frame.

Unlike the first RTS message sent in block 312, the following RTS messages sent in this block do not need to contend the channel.

In the exemplary embodiment, the transmitter sends out a RTS message A and data at the reserved time, and then sends out a RTS message B and data at a time being one super-frame, i.e. L, after the reserved time, then sends out a RTS message and data for every super-frame. The previous RTS message includes a reservation for the time at which the next RTS and data are to be transmitted.

It is also possible that a CTS is received with an indication that the reservation request is failed because at the receiver side the requested time is occupied with other transmissions. In that case, the receiver may propose new reservation time and include it in the CTS packet. After the transmitter receives the CTS, it may check the availability of the proposed reservation time and send out a RTS again to confirm the request adjustment. Upon receiving the next CTS, the traffic transmission begins.

The transmission of the RTS/CTS pair is used to solve hidden node problem. In wireless networking, the hidden node problem occurs when a node A is visible from a node B, but not visible from other nodes communicating with the node B. This leads to difficulties in media access control. The RTS/CTS pair enables the transmitter and receiver to inform any hidden node of the transmission reservations, therefore solving the problem.

Figure 4:
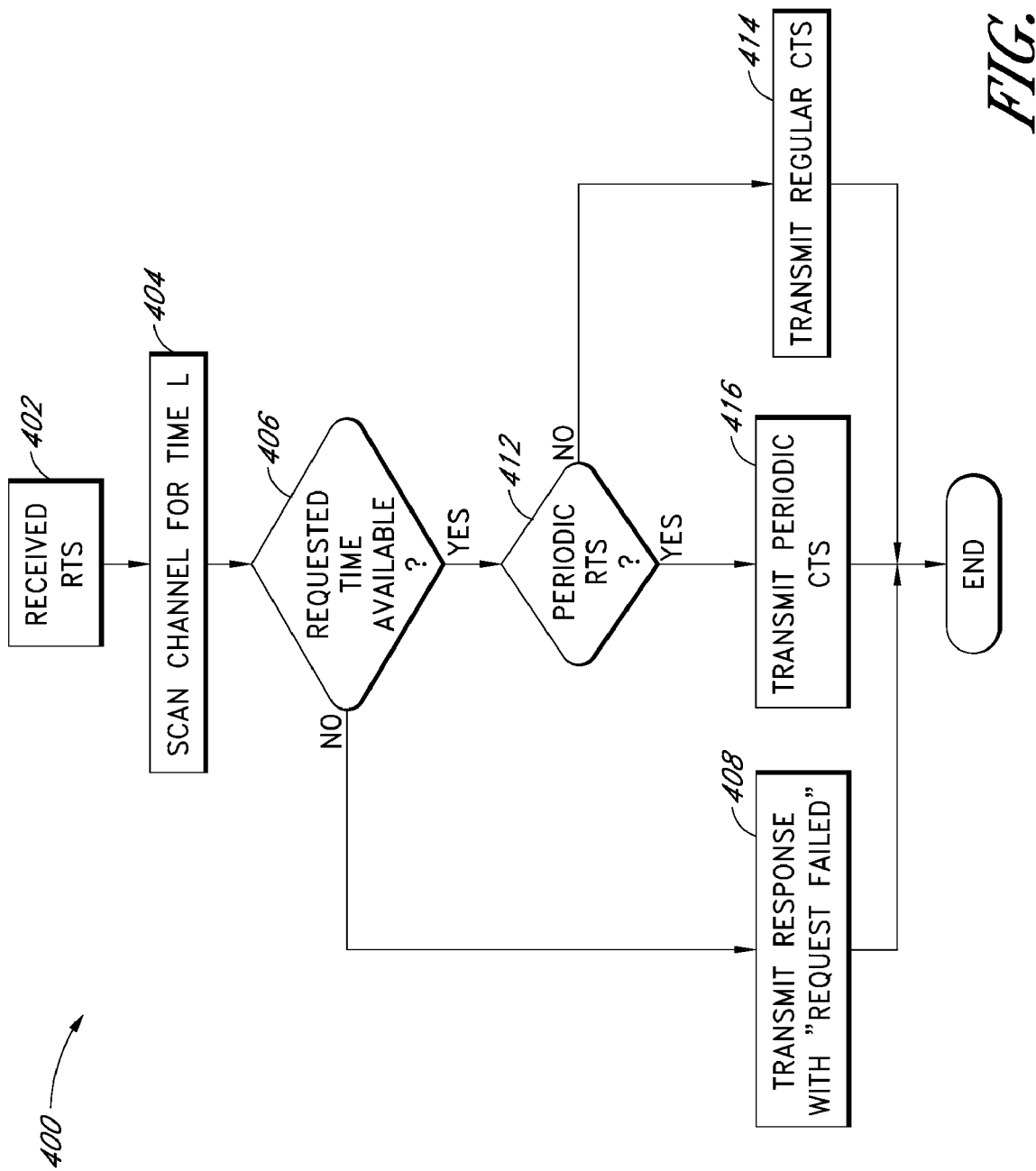
FIG. 4 is a flowchart illustrating one embodiment of a method for reserving channel bandwidth in a wireless ad-hoc network which may be performed by a receiver.

FIG. 4 is a flowchart illustrating one embodiment of a method for reserving channel bandwidth in a wireless ad-hoc network. The method may be performed, for example, by a receiver in the wireless ad-hoc network 100. The wireless receiver is a wireless station receiving data from another wireless station ("transmitter"). The method may be performed by the control unit of the receiver running a random access control software module stored in the storage unit of the receiver. Depending on the embodiment, certain blocks of the method may be removed, merged together, or rearranged in order.

The method 400 starts at a block 402, wherein the receiver receives a request-to-send (RTS) frame from a transmitter. The RTS message includes the time block to reserve for transmission. The RTS message may also include information indicating whether the channel reservation is isochronous or one-time, depending on the traffic type.

Moving to a block 404, the receiver scans the channel for a fixed amount of time L, i.e., the duration of a super-frame. Next at a block 406, the receiver determines whether the channel is available at the receiver side for the time proposed by the RTS message based on the scanning.

If the requested time is not available, the method 400 moves to a block 408, wherein the receiver sends a response to the transmitter indicating that the proposed time for transmission is rejected and a suggested new reservation time.

If the requested time is available, the method 400 moves to a block 412, wherein the receiver checks whether the channel reservation proposed is isochronous. If the proposed channel reservation is not isochronous, the method moves to a block 414, wherein the receiver transmits a clear-to-send (CTS) message confirming the reservation proposed by the RTS message for one time.

If the proposed channel reservation is isochronous, the method moves to a block 416, wherein the receiver transmits a CTS message at the reserved time periodically every super-frame. The previous CTS message includes a reservation for the time at which the next CTS is to be transmitted. The next CTS message is transmitted L time after the previous CTS message is transmitted.

Figure 5:
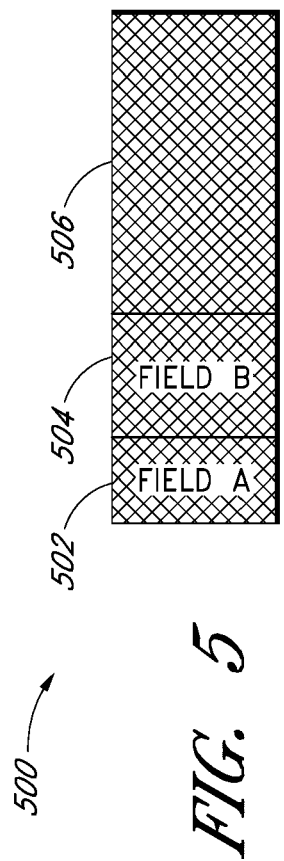
FIG. 5 is a diagram illustrating an exemplary format of the clear-to-send (CTS) or request-to-send (RTS) message.

FIG. 5 is a diagram illustrating an exemplary format of the clear-to-send (CTS) or request-to-send (RTS) message. The message 500 includes a field A 502 indicating whether the reservation is isochronous and a Field B 504 indicating the channel time reservations. The message 500 may optionally include a field 506 to store other information.

Figure 6:
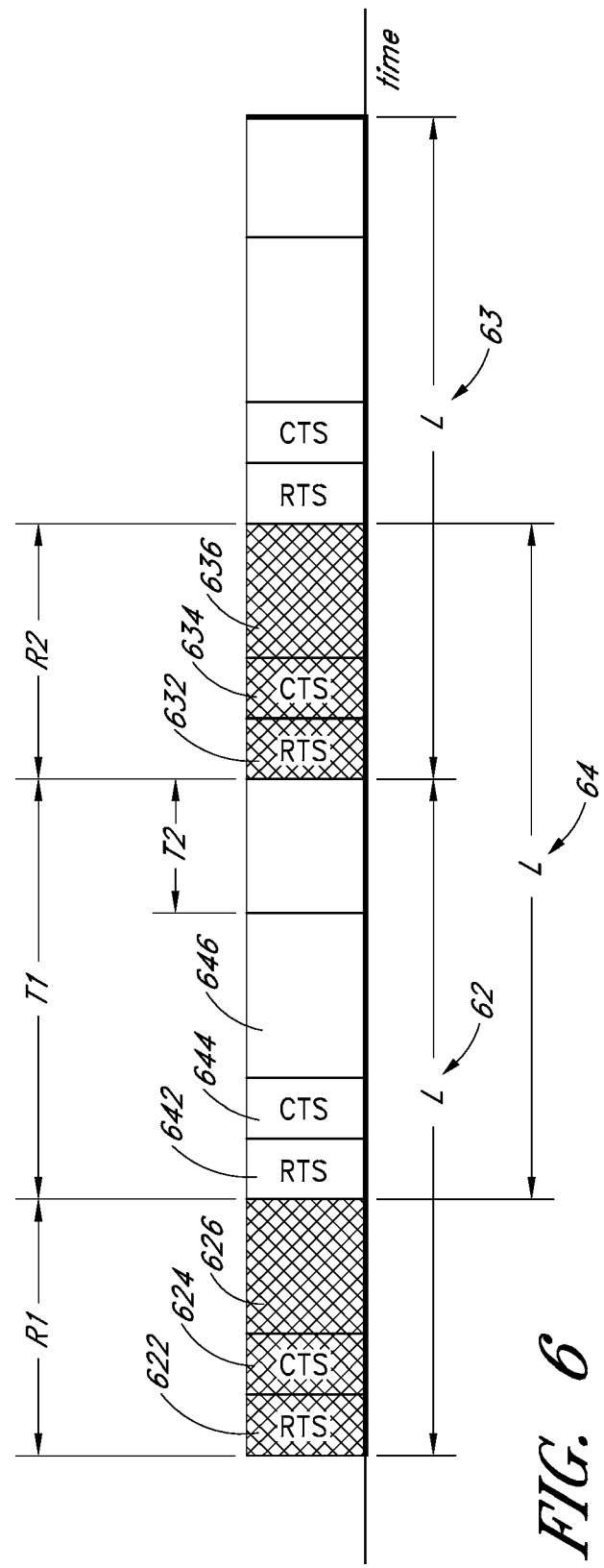
FIG. 6 is a diagram illustrating exemplary super-frames.

FIG. 6 is a diagram illustrating exemplary super-frames. A super-frame 62, 63, or 64 has a fixed length of time L and may start from a random time point. As mentioned above, a wireless device is expected to scan the channel for a super-frame period, i.e. time L before it sends out a one-time RTS or the first isochronous RTS message for a particular data transmission. If the channel is idle, the transmitter transmits a RTS message which reserves a time block, e.g. the time block R1. If the RTS message is received correctly by the receiver and the requested time is checked as free after the receiver scans the channel for time L, the receiver transmits a CTS message. If the CTS message is received correctly, the transmitter starts to transmit data. The transmission can be isochronous or a one time data burst as indicated by the RTS/CTS message.

Once reservation for isochronous transmission is confirmed by a first pair of RTS/CTS messages, the transmitter and the receiver send out RTS, CTS messages, and data at the reserved time periodically every super-frame. A super-frame corresponds to a cycle of the isochronous transmission for a particular transmission task. In the exemplary embodiment, a RTS, CTS, and data block are transmitted once within each super-frame. The next RTS, CTS, and data transmission occurs L time after the previous RTS, CTS, and data transmission.

In the example shown in FIG. 6, the transmitter sends out a RTS message 622. The receiver receives the RTS message 622 and then sends out the CTS message 624. The transmitter then sends out data 626. The transmission of the RTS 622, CTS 624, and data 626 is performed all within the reserved time R1. No scanning of the channel is needed prior to the transmission of the RTS 622, CTS 624, and data 626 since the reserved time is confirmed for isochronous transmission by prior RTS/CTS transmission (described above but not shown in FIG. 6). The super-frame 62 starts from the RTS 622. The next super-frame 63 starts from the next RTS 632. In the super-frame 63, a RTS 632, CTS 634, and data 636 are transmitted L time after the RTS 622, CTS 624, and data 626 respectively.

The RTS 622, 632, and the CTS 624, 634 are transmitted in order to inform other devices of the ongoing isochronous transmission represented by super-frames including super-frames 62 and 63. Any device which hears an isochronous/periodic RTS or CTS may not contend the channel in the current and the next super-frames where the periodic reservations are made. But for the unreserved channel time, devices can contend. In the exemplary embodiment, the RTS 622 and the CTS 624 indicate an isochronous transmission and a reserved time block R2, therefore informing other devices of the oncoming transmission of the super-frame 63.

The exemplary embodiment also supports multiple data traffic on the same wireless channel at a transmitter or receiver, e.g., an audio stream and a video stream, or two different video streams. As shown in FIG. 6, the transmission of the super-frames 62 and 63, do not exhaust all the channel time at the same transmitter transmitting the super-frames 62 and 63. The transmitter may use the time block T1 within the super-frame 62 and each super-frames thereafter for other transmission. For example, an isochronous RTS 642, a CTS 644, and data 646 may be transmitted within that period. The isochroous RTS 642 defines a super-frame 64 overlapped with the super-frames 62 and 63. No scanning of the channel is needed prior to the transmission of the RTS 642, CTS 644, and data 646 since the reserved time is confirmed for isochronous transmission by prior RTS/CTS transmission (not shown in FIG. 6). The time block T2 may be used for additional data transmission.

Because of the isochronous transmission of the super-frame, the start of the super-frame can be from any periodic/isochronous RTS/CTS. Each isochronous transmission task may have its own super-frames starting from different time points. In FIG. 6, one isochronous transmission has its super-frame started from the RTS 622 and another from the RTS 642. When there is no isochronous traffic, devices can transmit at anytime for a one time data burst if the channel is idle.

The data traffic may be either one-way or two-way. In two-way transmissions, the transmitter transmits data such as audio/video traffic to the receiver while the receiver transmits an acknowledgement message to the transmitter upon receipt of the data. The transmitter needs to ensure that the reservation time does not interfere with any ongoing traffic that happens at the transmitter side. Also if a correct CTS is received, in every following super-frame, a RTS is transmitted at the same position of the super-frame to protect the isochronous traffic from being interfered.

In one-way transmission, the transmitter transmits data without requiring any acknowledgement. In this case, only nodes within the range of the receiver need to refrain from transmitting. Therefore, at the transmitter side, the nodes within the range can still transmit if they do not interfere with the reception at the receiver side. So the reservation time can be overlapping with the ongoing transmission at the transmitter side. Then if a correct CTS is received, the transmitter does not need to transmit the periodic RTS. Only isochronous data traffic is transmitted by the transmitter. The receiver transmits periodic CTS to clear the medium around the receiver.

As shown above, the exemplary embodiment may support multiple data traffic on the same wireless channel at a transmitter or receiver. For example, a transmitter Ta may use the super-frames including the super-frame 62 to send an audio stream to a receiver Tb and use the super-frames starting from the super-frame 64 to send a video stream to a receiver Tc. The video stream and the audio stream may also be transmitted to the same receiver Tb.

Certain embodiments as described above propose a random access scheme for devices to reserve bandwidth for isochronous traffic in a wireless ad-hoc network. This scheme supports multiple data transmission tasks at the same wireless channel at a transmitter or receiver. In the exemplary scheme, fixed length super-frames are used. Any device need to listen to the channel for one super-frame time before it transmits the first RTS message for a particular data transmission. If periodic RTS or CTS messages for other traffic are heard, the device may not transmit for the reserved time in current super-frame and the next super-frame. The transmitter and receiver need to contend the channel to transmit a first pair of RTS and CTS messages.

Once the isochronous reservation is confirmed, a RTS message is transmitted periodically by the transmitter and a CTS message periodically by the receiver every super-frame. The following isochronous RTS/CTS pairs are transmitted at the reserved channel time reserved by the previous pairs. Since the following RTS/CTS do not have to contend the channel use, the scheme implements a high channel utilization.

In certain embodiments, the RTS/CTS message serve only for bandwidth reservation purpose for a particular data transmission, therefore introducing low overhead. The first pair of RTS/CTS for a particular data transmission may be transmitted at a random time point, after scanning the channel for a super-frame and confirming that the channel is not in use. For isochronous reservation, once the reservation is confirmed, the RTS and CTS message are transmitted periodically every super-frame.

The foregoing embodiments may be used for medium access control for transmitting uncompressed high definition video signals in a wireless ad-hoc network. However, the embodiments should not be limited to that use. The embodiments may be used for transmitting any data or signals including isochronous audio/video traffic.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of reserving channel bandwidth for transmission in a wireless ad-hoc network, the method comprising:
   at a transmitter node in a wireless ad-hoc network:
   scanning the wireless channel for a fixed amount of time (L) to determine whether there is free channel time;
   transmitting a first request-to-send (RTS) frame to the receiving node if there is free channel time, the first RTS message indicating the first time block reserved for channel use and whether the reservation is periodic;
   transmitting data to a receiving node in a wireless ad-hoc network in a first time block previously reserved for data transmission; and
   transmitting data to the receiving node in a second time block if the reservation is periodic, the second time block starting at a time being the fixed amount of time L after the start of the first time block.

2. The method of claim 1,
   wherein scanning the wireless channel for the fixed amount of time (L) to determine whether there is free channel time, transmitting a first RTS frame to the receiving node if there is free channel time, and receiving a first clear-to-send (CTS) frame from the receiving node confirming the reservation requested are performed prior to the transmitting of data in the first and second time block.

3. The method of claim 2, further comprising transmitting a second RTS message prior to transmitting data in the second time block.

4. The method of claim 2, further comprising receiving a second CTS message prior to transmitting data in the second time block.

5. The method of claim 3, wherein the second RTS message indicates the second time block reserved for channel use and whether the reservation is periodic.

6. The method of claim 3, further comprising transmitting a third RTS message indicating a third time block reserved for channel use and whether the reservation is periodic.

7. The method of claim 2, wherein the first time block starts at a random time point.

8. The method of claim 2, wherein the duration of the first time block is less than L.

9. The method of claim 2, wherein the transmitting node communicates to the receiving node via directional transmission.

10. The method of claim 2, wherein the transmitting node communicates to the receiving node via omnidirectional transmission.

11. The method of claim 2, wherein the first RTS message is transmitted in free channel time as determined by the channel scanning.

12. The method of claim 2, wherein the first time block is selected to be in free channel time.

13. The method of claim 2, wherein the scanning of a wireless channel comprising, upon detecting a RTS or CTS message indicating a periodic reservation and a reserved time block, determining that the channel is not free during the reserved time block and another time block, the other time block starting at a time being L after the start of the reserved time block.

14. The method of claim 2, wherein the channel is not scanned between the data transmission in the first time block and the data transmission in the second time block.

15. The method of claim 2, further comprising:
   at the receiver node in the wireless ad-hoc network:
   receiving the first RTS message;
   scanning a wireless channel at the receiving node for the fixed amount of time (L) to determine whether the channel is free for the time requested by the first RTS message; and
   transmitting a first clear-to-send (CTS) frame confirming the reservation requested by the first RTS message if the channel is free for the time requested.

16. The method of claim 15, wherein the scanning of a wireless channel at the receiving node comprises, if the first RTS message requests periodic reservation, determining that the time requested is not available if the channel is not free during the first time block or the second time block.

17. The method of claim 15, further comprising transmitting a response rejecting the reservation requested by the first RTS message and proposing a different reservation time, if the channel is free for the time requested.

18. A non-transitory computer-readable medium having stored a software module which, when being executed by a computer, performs the method of claim 1.

19. A device for data transmission in a wireless ad-hoc network, the device comprising:
   a storage unit having stored therein a software module; and
   a control unit configured to execute the software module to:
   scan the wireless channel at a transmitting node for a fixed amount of time (L) to determine whether there is free channel time;
   transmit a first request-to-send (RTS) frame to the receiving node if there is free channel time, the first RTS message indicating the first time block reserved for channel use and whether the reservation is periodic;
   transmit data to a receiving node in a wireless ad-hoc network in a first time block previously reserved for data transmission; and
   transmit data to the receiving node in a second time block if the reservation is periodic, the second time block starting at a time being a fixed amount of time L after the start of the first time block.

20. The device of claim 19, wherein
   the scan of the wireless channel at the transmitting node for the fixed amount of time (L) to determine whether there is free channel time, the transmit of the first RTS frame to the receiving node if there is free channel time, and a receive of a first clear-to-send (CTS) frame from the receiving node confirming the reservation requested by the first RTS message are performed prior to the transmitting of data in the first and second time block.

21. A device for data transmission in a wireless ad-hoc network, the device comprising:
a storage unit having stored therein a software module; and
a control unit configured to perform the software module to:
receive an initialization request-to-send (RTS) frame from the transmitting node, the first RTS message indicating the first time block reserved for periodic channel use;
scan a wireless channel for the fixed amount of time (L) to determine whether the channel is free for the time requested by the initialization RTS message;
transmit a first periodic clear-to-send (CTS) message to a transmitting node in a wireless ad-hoc network in a first time block previously reserved for periodic transmission; and
transmit a second periodic CTS message to the transmitting node in a second time block if the reservation is periodic, the second time block having the same duration as the first time block and starting at a time being with a fixed amount of time (L) after the start of the first time block.

22. The device of claim 21, wherein
the receive of the initialization RTS frame from the transmitting node, the scan of the wireless channel for the fixed amount of time (L) to determine whether the channel is free for the time requested by the initialization RTS message, and a transmit of an initialization CTS frame to the transmitting node confirming the reservation requested by the initialization RTS message if the channel is free for the time requested are performed prior to the transmitting of the first and second periodic CTS messages.

23. The device of claim 22, wherein the channel is not scanned between the transmitting of the first periodic CTS message and the second periodic CTS message.

24. A receiver for receiving data transmitted in a wireless ad-hoc network, the receiver comprising:
a storage unit having stored therein a software module; and
a control unit configured to perform the software module to:
receive an initialization request-to-send (RTS) frame from a transmitting node, the first RTS message indicating the first time block reserved for periodic channel use;
scan a wireless channel for the fixed amount of time (L) to determine whether the channel is free for the time requested by the initialization RTS message;
transmit a first clear-to-send (CTS) message to the transmitting node in a first time block previously reserved for periodic transmission; and
transmit a second periodic CTS message to the transmitting node in a second time block if the reservation is periodic, the second time block having the same duration as the first time block and starting at a time being with the fixed amount of time (L) after the start of the first time block.

25. A method of reserving channel bandwidth for transmission in a wireless ad-hoc network, the method comprising:
at a receiver node in a wireless ad-hoc network:
receiving an initialization request-to-send (RTS) frame from a transmitting node, the first RTS message indicating the first time block reserved for periodic channel use;
scanning a wireless channel for the fixed amount of time (L) to determine whether the channel is free for the time requested by the initialization RTS message;
transmitting a first clear-to-send (CTS) message to the transmitting node in a first time block previously reserved for periodic transmission; and
transmitting a second periodic CTS message to the transmitting node in a second time block if the reservation is periodic, the second time block having the same duration as the first time block and starting at a time being with the fixed amount of time (L) after the start of the first time block.

* * * * *